Figure 3:
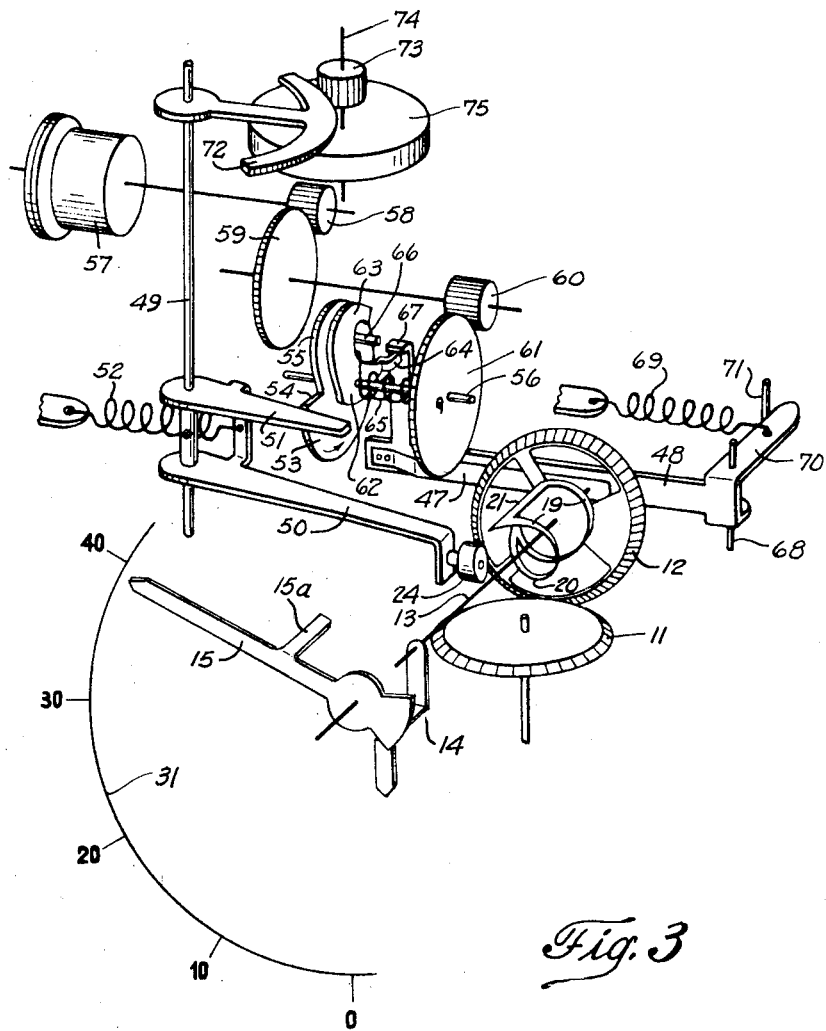

Feb. 2, 1960  E. WIDMER  2,923,886
DEMAND METERING APPARATUS
Filed April 18, 1957  2 Sheets-Sheet 1
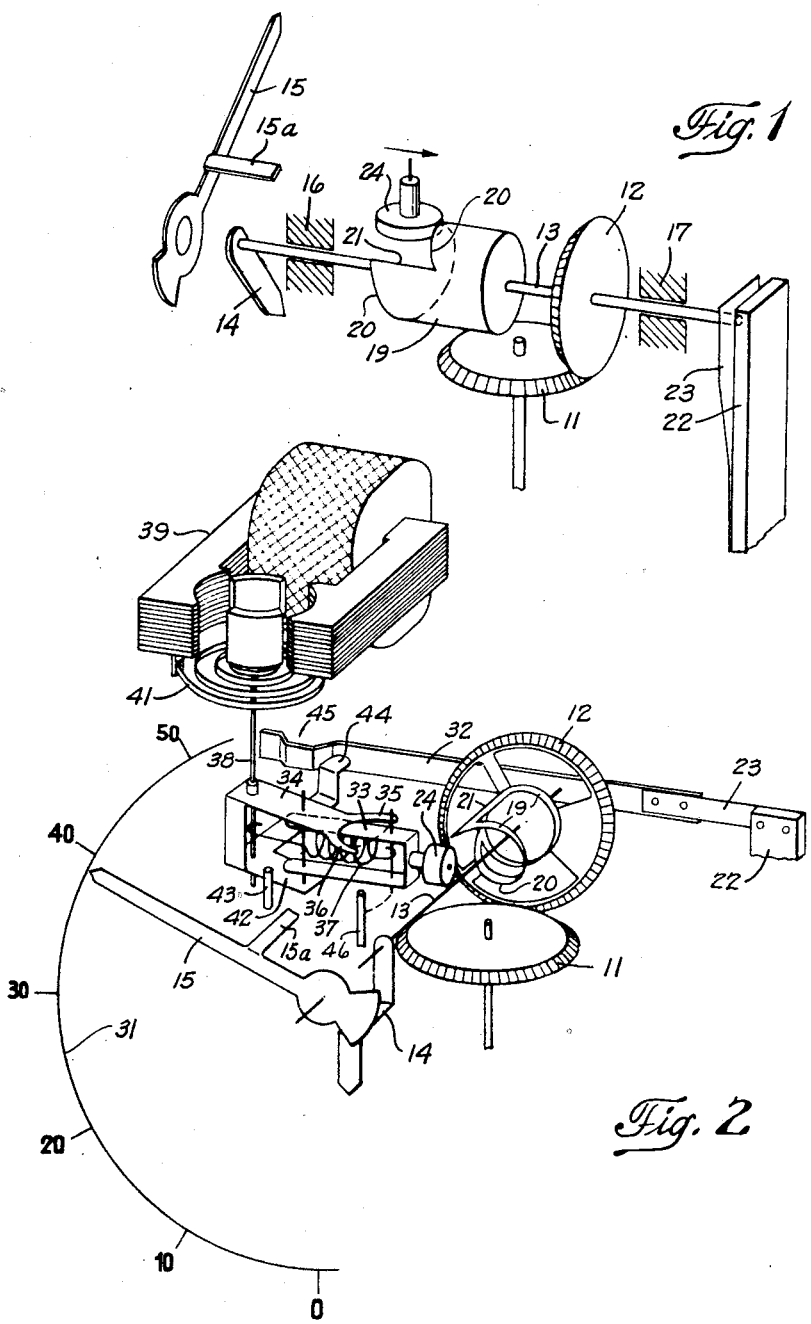
INVENTOR
ERNST WIDMER
BY
Morgan, Finnegan, Durham & Pine
ATTORNEYS.

Feb. 2, 1960　　　　　E. WIDMER　　　　2,923,886
DEMAND METERING APPARATUS
Filed April 18, 1957　　　　　　2 Sheets-Sheet 2

INVENTOR
ERNST WIDMER
BY
Morgan, Finnegan, Durham & Pine
ATTORNEYS.

United States Patent Office 2,923,886
Patented Feb. 2, 1960

2,923,886

DEMAND METERING APPARATUS

Ernst Widmer, Oberwill, Zug, Switzerland, assignor to Landis & Gyr A.G., Zug, Switzerland, a body corporate of Switzerland Application April 18, 1957, Serial No. 653,572

Claims priority, application Switzerland April 21, 1956

7 Claims. (Cl. 324—103)

The present invention relates to novel and improved demand metering apparatus especially for measuring the maximum demand for electric power.

In conventional demand meters a driver is located on a shaft that is intermittently coupled with the meter armature and is periodically uncoupled, which driver during the measuring period urges the maximum pointer upwards and is carried back to its initial position at the uncoupling. Frequently a spring is used for the return of the driver, which spring is stretched during the measuring period. Such an arrangement has the disadvantage that the retracting spring loads the meter armature causing measuring errors thereby. The periodical coupling and uncoupling of the driver shaft is moreover effected in the well-known manner by a switch clock by means of a switching magnet or a synchronous motor which serves as a timing member and effects the uncoupling for example by means of a revolving cam. In most cases uncoupling is effected by two gears being moved out of engagement. Such coupling arrangements have the disadvantage that the uncoupling process must last at least long enough for the driver to have sufficient time to return from its greatest deflection to the zero position. In any case in this arrangement the duration of time of the uncoupling process is in most cases for purely structural reasons considerably greater than would be required for the return of the driver. This uncoupling time also gives rise to a measuring fault.

In order to avoid said fault it has previously been proposed to derive the return force for the driver from the time element instead of from a spring. Thus it was proposed to take the return force from the synchronous motor by means of a magnetic coupling with the driver, for example a so-called hysteresis coupling. However, thereby we attain merely an additional constant motor load, equal to the magnetic moment of the coupling. Proposals have also become known to make the duration of the uncoupling dependent on the deflection of the driver and to cause the recoupling to take place immediately after the zero position has been reached. Such arrangements are also described as "rapid releasing devices" and may be of an electrical or mechanical kind. However, hitherto they have not been entirely satisfactory as they are uncertain in a simple design or, if they are to act with certainty, they involve a complicated mechanism requiring relatively much power.

The present invention has for an object the provision of a novel and improved demand meter apparatus which is of simple construction, highly reliable and which provides more accurate measurements than have heretofore been usual. Still another object is the provision of an improved demand meter in which the zeroizing means is normally out of engagement with the registering means, so that the registering means may be advanced with a minimum of load on the metering disc of the electricity meter which actuates it.

The present invention has for a further object the elimination of both of the drawbacks mentioned at the same time. It provides a demand register, especially for an electricity meter which is characterized by a cylinder fixed to a rotatable and axially displaceable shaft, the cylinder being formed at one end with a helical edge and a roller for the uncoupling and the simultaneous resetting of the shaft as the roller presses on the edge of the helix. Appropriately the uncoupling shaft has an angular transmission gear on which the uncoupling takes place. The roller pressing on the helical edge is advantageously mounted on a rocker arm which is hinged on a lever swinging in the direction of a cylinder surface line and on reaching the zero position of the cylinder tips the roller away from the helical edge if the period of measurement is determined by means of a clock controlled by a magnetic switch. However, if the determination of the measuring period is effected by means of a synchronous motor, the roller pressing on the spiral edge of the cylinder is appropriately mounted on a swivelling lever which rests with one spring-pressed arm on the circular edge of a disk driven by the synchronous motor, which edge is interrupted by a gap into which gap the lever arm drops for the uncoupling and return position, and a bolt swiveling about the shaft of the disk and which is retained during the rotation of the disk by spring tension by a disengageable stop, releases said gap again and, after the resetting has been completed, closes the gap again with a snap in consequence of the disengagement of the stop, thus lifting the arm of the lever to engage again with the edge of the disk.

The accompanying drawings, referred to herein and constituting a part hereof, illustrates two embodiments of the invention, and together with the description, serve to explain the principles of the invention.

Of the drawings:

Figure 1 shows the principle of the driving shaft of a demand meter;

Figure 2 schematically shows a preferred embodiment of the subject matter of the invention, with a switching magnet for releasing the measuring period; and Figure 3 shows a modified embodiment of the invention with synchronous motor.

Referring now in detail to the illustrative and preferred embodiment of the invention as shown in Figure 1 a meter disk (not shown) drives, by means of a mitre wheel gearing 11 and 12, a shaft 13 carrying a driving member which during the measuring periods advances a demand pointer 15. The demand pointer 15, as usual, is held by friction and remains in the position it has reached when the driver 14 is returned to zero to its initial position at the end of a measuring period. To effect zeroing of the driver, the shaft 13 is mounted in two bearings 16, 17 in an axially displaceable manner, and carries a cylinder 19 one edge of which defines a helical line. A longitudinal edge 21 passing along a generating line 20 connects the two ends of the spiral edge. A leaf spring 23 attached to a stationary support 22 presses on the end of the shaft 13 and thus normally holds the bevel gear 12 in engagement with the driving bevel gear 11. The uncoupling and return of the shaft 13 is effected by a freely rotatable roll 24 mounted on an axis normal to the shaft 13 and controlled by a time element not shown, to be pressed periodically against the helical edge 20.

The roll 24 is urged towards the helical edge 20 in the direction of the arrow, and Figure 1 shows the moment when the roll 24 just touches the helical edge. As the roller 24 is pressed farther in the direction of the arrow, the shaft 13 is first displaced while straining the spring 23 until the bevel wheel 12 is disengaged, whereupon the helical edge 20 rolls on the roller 24 turning back the shaft 13 until the longitudinal edge 21 of the cylinder strikes the roller 24, at which time the starting point has been reached and the pointer 14 has been returned to zero. Thereupon the roller 24 is moved in the opposite direction, the pressure of the spring 23 causes the shaft 13 to be pushed back, the bevel gear 12 is coupled again, and the roller 24 is lifted from the helical edge to release the shaft 13 for the measuring process.

The to-and-fro motion of the roller 24 takes place periodically, controlled by a time element. Such control is preferably energized by a switching magnet controlled by a clock contact in such a manner that the to-and-fro motion is effected by the switching magnet; that is the uncoupling lasts as long as the clock contact is energized. However, the arrangement may also be such that only the zeroizing motion of the roller is effected by a switching magnet, and the return motion is effected independently of the switching magnet immediately after reaching the zero position, e.g. by means of a toggle mechanism. An example of embodiment of the latter kind is shown in Figure 2.

The control of the roller 24 may, however, also be effected by a synchronous motor, as shown in Figure 3.

In the embodiment shown in Figure 2 a meter (not shown) drives a shaft 13 by means of a bevel gearing 11 and 12 provided with a driver 14 which advances a trailing pointer 15. The position of either pointer 14 or 15 can be read from a scale 31. On the shaft 13 there is seated again a cylinder having a helical edge 20 and a generating line 21, the body of which is cut away except for a narrow strip 19 from which the edges 21 are formed, so as to reduce the mass moment of inertia and thereby the required accelerating forces. For the same reason the base of the bevel gear 12 is provided with cut-outs in such a manner that the entire shaft assembly is counterbalanced. Shaft 13 is exposed to the force of a spring 23 which is stretched by means of a rigid arm and which during the measuring period keeps the bevel gear 12 in engagement with the bevel gear 11. Roller 24 is mounted on a rocker arm 33 which is hinged on a lever 34. The lever 34 ends in a fork between the ends of which 35, 36 the rocking arm 33 can be rocked to and fro. The rocking force is furnished by a tension spring 37 stretched between the rocker arm 33 and the lever 34. The lever 34 is rigidly seated on the armature shaft 38 of a switching magnet 39 which is controlled by a contact of a time switch. The armature shaft 38 is under the influence of the turning movement of a spiral spring 41 fixed to the switching magnet 39, and in the position of rest one arm 42 of the lever 34 is located at the fixed stop 43. Moreover the lever 34 is provided with an arm 44 by means of which it controls the arm 32 which is provided with a bent portion 45.

Figure 2 shows the arrangement in the zero position at the beginning of the measuring period. Now if the meter drives the shaft 13 by means of the bevel gears 11, 12, the driver 14 approaches the driven pointer 15 and the helical edge 20 of the cylinder 19 approaches the roller 24. If the supply exceeds the value indicated by the driven pointer 15, the driver 14 reaches during the measuring period the driven pointer 15 and continues to advance it. At the end of the measuring period the switching magnet 39 is cut in, and the lever 34 turns to the rear. Thereby the arm 44 first moves to the bent part 45, and the arm 32 releases the shaft 13 for the uncoupling. As the lever 34 continues to swing, the roller 24 strikes the helical edge 20 of the cylinder and uncouples and turns the shaft 13 back to zero position, as described before. The lever 34 swings further, causing rocker arm 33 to rock from the end 35 of the fork to the end 36, and the roller 24 is released from the helical edge 20 of cylinder 19. Simultaneously, arm 44 is freed from the bent part 45 and the arm 32 again presses the bevel gear 12 into engagement with the bevel wheel 11. All these events take place while the switching magnet is being rotated into the working position.

The new measuring period begins immediately after the rotation is terminated and does not depend on the time for which the switching magnet has been cut in. If the cutting-out and turning-back of the switching magnet take place for example after 10 seconds, the arm 44 moves back over the bent 45 and thereby deflects the arm 32, however without the coupling of the gears 11, 12 being interrupted as no axial force acts on the shaft 13. Shortly before the termination of the turning-back motion the rocker arm 33 thrusts against a fixed stop 46, whereupon it is tilted back to the other end 35 of the fork. The setting-back is terminated when the arm 42 strikes again against stop 43.

Figure 3 of the drawing shows a modified form of a demand meter for electric power measurement with a synchronous motor for the determination of the measuring period. The bevel gears 11 and 12, the shaft of the driver 13, the driver 14, the peak position 15, the scale 31, the cylinder 19 with the helical edge 20 and the edge 21 as well as the roller 24 acting on the cylinder may correspond to the arrangement shown in Figure 2.

The shaft 13 is subjected to the force of a leaf-spring 47 which is riveted to a lever 48 and keeps the bevel gear 12 in engagement with the bevel gear 11 during the measuring periods. The roll 24 pressing on the helical edge 20 for the purpose of uncoupling and returning the driver shaft 13, is mounted on a lever 50 swinging about a vertical shaft 49. One arm 51 of this lever system 50 lies on the edge of a disk 53 pressed by a spring 52. The disk 53 is essentially circular, but is provided with a gap which is bounded by a curve 54 and a curve 55 leading back to the circular edge. The disk is fixed to shaft 56 and is driven by a synchronous motor 57 by means of the gears 58, 59, 60 and 61 with uniform speed in the direction of the arrow shown in the drawing. It makes one revolution per measuring period. Associated with the disk 53 is a bar 62 swivelable about the shaft 56. Bar 62 is provided with two arms 63 and 64. Arm 63 is bounded by a curve which corresponds to the curve 55 of the disk 53 and follows preferably an Archimedian screw and terminates in an arc of a circle having the radius of the disk 53. The other arm is bent at right angles laterally and does not project beyond the edge of the disk 53. The bar is acted on by the force of a spring 65 which is fixed to the wheel 61 and serves the purpose of opening and closing momentarily the gap formed during the rotation of the disk 53 by the edges 54, 55. When the gap is closed the arm 64 of the bar 62, pressed by the force of the spring 65, abuts a pin 66 seated on the disk 53. During the rotation of the disk 53 the arm 64 is caught on a shoulder 67 of a lateral arm of the lever 48 which can swing about a vertical shaft 68 and which pressed by a spring 69 presses one arm 70 against a fixed stop 71. The gap is opened by the arm 64 being held fast with the disk continuing to turn. If the radial sloping edge 54 reaches the arm 51 the latter drops into the gap through the force of the spring 52. This causes the lever 50 to turn and roller 24 drives on the helical edge 20 of the cylinder 19.

On account of the pressure exerted by the roller 24 on the helical edge 20 the leaf-spring 47 first steps aside so that the bevel gear 12 is disengaged from the bevel gear 11, whereupon the cylinder 19 is turned by the further swinging of the roll 24 until the driving member 14 is in the zero position. However, as the roller 24 continues to press in the axial position on the cylinder the lever 48 is deflected while the spring 69 is being set so that the tip 67 releases the arm 64 of the bar 62. The force of the spring 65 causes the bar 62 to close the gap 54, 55 as with a snap, lifting the arm 51 again onto the edge of the disk and swinging the lever 50 and the roller 24 back into the starting position. This event is repeated once in every rotation of the disk and takes place very rapidly because the energizing springs 52, 65, 69 are only opposed by small frictional forces and by small accelerating forces on account of the low mass of the moved parts.

It is, however, expedient to make the springs 52, 65, 69 relatively strong and to damp the swinging motion of the lever 50 by means of an inertia mass for the purpose of avoiding knocks. This may be accomplished by fixing on the shaft 49 a tooth segment meshing with a pinion 73, on the shaft of which 74 a damping disk 75 acting as an inertia mass is arranged. The damping disk 75 can be firmly fixed to the shaft, as in every direction of acceleration a spring power increasing linearly with the motion counteracts until the damping disk 75 comes to a stop. To insure that the swinging-out motion of the levers 48 and 50 is not too great it is expedient to couple the damping disk in the manner known per se by means of sliding friction with the shaft 74 causing part of the energy of acceleration to be used up by energy of friction and the levers 50, 51 to swing out only to the distance required.

The arrangement of a damping disk is also expedient when using a switching magnet and a switch clock for determining the period of measurement as in the example of embodiment of Figure 2.

The toothed miter gear is constituted in both examples of embodiment by two bevel gears. The supposition is that no essential change of number of revolution is desired, but the bevel gear mainly serves as a coupling. It is in this case expedient to provide as fine a toothing as possible for the bevel gears so as to diminish measuring faults in coupling. Cycloidal toothing is advantageous and a neat and exact tooth formation is absolutely necessary. However, where besides the coupling a substantial number of revolutions is to be attained it is more expedient to replace the bevel gear 11 by a pinion and the bevel gear 12 by a crown wheel.

In addition to avoiding the drawbacks mentioned in the introduction, the invention offers additional essential advantages. Usually demand meters have a friction clutch on the drive shaft to avoid jamming, e.g. when the range of measuring is exceeded or in setting back the maximum pointer during a measuring period. The invention makes it possible to do away with such a friction clutch. If for example at the end of the measuring range, i.e. at the scale end deflection, the helical edge 20 reaches the roller 24, the bevel gear 12 is also moved out of gear and when bevel gear 11 continues to turn the angle gear acts like a fine friction clutch. Without the component of force arising between roll and helical edge in the direction of the shaft 13 the teeth of the two bevel gears mesh flawlessly. In order to enable one to set back the trailing pointer 15 also during a measuring period it is necessary to create also between the driver 14 and the trailing pointer 15 a component of force which in the direction of the shaft 13 produces uncoupling. This may be effected by not bending laterally at a right angle with the plane of the pointer, the side arm 15a of the trailing pointer which is caught by the driver as shown in the drawing, but bending it in an obtuse angle. The moment of friction of the trailing pointer is so slight that the component of force formed in dragging up the pointer does not suffice for coupling. However, if a greater force acts against the direction of the rotation of the trailing pointer, e.g. a limit stop or a resetting force, there is formed between the lateral arm 15a of the trailing pointer and the driver 14a component of force that is greater than the force of the spring 23, so that an uncoupling of the bevel gears 11, 12 is effected.

The invention in its broader aspects is not limited to the specific mechanisms shown and described but departures may be made therefrom within the scope of the accompanying claims without departing from the principles of the invention and without sacrificing its chief advantages.

What is claimed is:

1. Demand metering apparatus for electricity meters including in combination an axially displaceable shaft to be rotated in accordance with a value being measured, said shaft having a bevel gear thereon normally meshing with a second bevel gear driven by a rotatable metering element, said bevel gears being disengaged by axial movement of said shaft, a registering pointer carried by the shaft, a demand pointer driven thereby in one direction, a cylinder carried by and fixed on the shaft and having a helical shaped edge at one end of the cylinder and a roller movable to press against the helical edge of the cylinder to move the cylinder and shaft axially to disengage the bevel gears and by the same action to rotate the shaft and registering pointer back to their zero position.

2. Demand metering apparatus as claimed in claim 1 in which the roller is rotatably mounted on a pivoted lever and is periodically moved toward and from the helical edge of the cylinder.

3. Demand metering apparatus including in combination a registering pointer mounted on an axially displaceable shaft which is rotated in accordance with power consumption measuring means, a cylinder carried by the shaft, said cylinder having a helical edge, a roller periodically engageable with the helical edge of said cylinder and co-acting with said cylinder whereby said shaft is uncoupled from said power consumption means and is also rotated for returning the shaft to zero, and spring means to urge the roller against the helical edge.

4. Apparatus according to claim 3, including electromotive means which furnish displacement for said roller, and roller disengage means including spring means which impart a displacement to said roller independent of a change in the position of said electromotive means.

5. Apparatus according to claim 4 in which said roller is toggle mounted in support means, said support means being responsive to said electromotive means.

6. Apparatus according to claim 4 in which said roller disengage means includes a spring-actuated disengageable bar which is actuated at a predetermined position of said electromotive means to thereby disengage said roller independent of further movement of said electromotive means.

7. Demand metering apparatus for electricity meters comprising a driven bevel gear mounted on an axially displaceable shaft, a second bevel gear by which said driven bevel gear is rotated, said second bevel gear being actuated in accordance with a measured value, said driven bevel gear being uncoupled from said second bevel gear at the end of each measuring period by means of an axially movable member including a roller which is operative only during a zeroing period at the end of each measuring period, a cylinder having a helically shaped end and fixed to said axially displaceable shaft, said helical end of said cylinder being engaged by said roller which is movable axially of said shaft at the end of each measuring period simultaneously to disengage said bevel gears and rotatably move said shaft and said driven bevel gear to their zero positions, snap-acting roller disengage means operable to disengage said roller from the helical end of said cylinder upon rotation of said shaft and driven bevel gear to their zero positions, driving means coupled to said axially displaceable shaft, and demand indicating means responsive to said driving means.

References Cited in the file of this patent

UNITED STATES PATENTS

| | | |
|---|---|---|
| 1,089,065 | Marbach | Mar. 3, 1914 |
| 2,149,410 | Weisman | Mar. 7, 1939 |